(12) United States Patent
Seo et al.

(10) Patent No.: US 7,634,175 B2
(45) Date of Patent: Dec. 15, 2009

(54) RECORDING MEDIUM, REPRODUCING METHOD THEREOF AND REPRODUCING APPARATUS THEREOF

(75) Inventors: Kang Soo Seo, Anyang-si (KR); Jea Yong Yoo, Seoul (KR); Byung Jin Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 739 days.

(21) Appl. No.: 11/113,272

(22) Filed: Apr. 25, 2005

(65) Prior Publication Data

US 2005/0249375 A1    Nov. 10, 2005

Related U.S. Application Data

(60) Provisional application No. 60/564,960, filed on Apr. 26, 2004.

(30) Foreign Application Priority Data

Apr. 20, 2005    (KR) ............... 10-2005-0032720

(51) Int. Cl.
*H04N 5/00*    (2006.01)
*H04N 7/00*    (2006.01)
(52) U.S. Cl. .............. 386/125; 386/95; 386/126
(58) Field of Classification Search .......... 386/95, 386/125–126
See application file for complete search history.

(56) References Cited

U.S. PATENT DOCUMENTS

| | | | |
|---|---|---|---|
| 5,253,530 A | 10/1993 | Letcher, III | |
| 5,467,142 A | 11/1995 | Ichinokawa | |
| 5,519,443 A | 5/1996 | Salomon et al. | |
| 5,537,151 A | 7/1996 | Orr et al. | |
| 5,758,007 A | 5/1998 | Kitamura et al. | |
| 5,778,142 A * | 7/1998 | Taira et al. | ............ 386/97 |
| 5,781,687 A | 7/1998 | Parks | |
| 5,832,530 A | 11/1998 | Paknad et al. | |
| 6,128,434 A | 10/2000 | Hirayama et al. | |
| 6,173,113 B1 | 1/2001 | Okada et al. | |
| 6,204,883 B1 | 3/2001 | Tsukagoshi | |
| 6,219,043 B1 | 4/2001 | Yogeshwar et al. | |

(Continued)

FOREIGN PATENT DOCUMENTS

CN    1348588    5/2002

(Continued)

OTHER PUBLICATIONS

International Search Report dated Nov. 17, 2005.

(Continued)

*Primary Examiner*—Thai Tran
*Assistant Examiner*—Daquan Zhao
(74) *Attorney, Agent, or Firm*—Harness, Dickey & Pierce, P.L.C.

(57) ABSTRACT

The present invention provides a recording medium, reproducing method thereof and reproducing apparatus thereof. The present invention includes a text subtitle stream including at least one dialog presentation segment (DPS) and one dialog style segment (DSS) and a clipinfo file (*,clpi) as reproduction management information to reproduce the text subtitle stream, wherein map information mapped to a dialog presentation segment (DPS) within the text subtitle stream is recorded in the clipinfo file.

25 Claims, 20 Drawing Sheets

U.S. PATENT DOCUMENTS

| | | |
|---|---|---|
| 6,222,532 B1 | 4/2001 | Ceccarelli et al. |
| 6,230,295 B1 | 5/2001 | Watkins |
| 6,253,221 B1 | 6/2001 | Kim |
| 6,262,775 B1 | 7/2001 | Kim |
| 6,320,621 B1 | 11/2001 | Fu |
| 6,393,196 B1 | 5/2002 | Yamane et al. |
| 6,661,467 B1 | 12/2003 | Vam Der Meer et al. |
| 6,747,920 B2 | 6/2004 | Denda et al. |
| 7,151,617 B2 | 12/2006 | Fukushima et al. |
| 7,174,560 B1 | 2/2007 | Crinon |
| 7,188,353 B1 | 3/2007 | Crinon |
| 2002/0004755 A1 | 1/2002 | Balthaser |
| 2002/0010924 A1 | 1/2002 | Kalhour |
| 2002/0106193 A1 | 8/2002 | Park et al. |
| 2002/0135608 A1 | 9/2002 | Hamada et al. |
| 2002/0151992 A1 | 10/2002 | Hoffberg et al. |
| 2002/0159757 A1 | 10/2002 | Ando et al. |
| 2002/0194618 A1 | 12/2002 | Okada et al. |
| 2003/0039472 A1 | 2/2003 | Kim |
| 2003/0085997 A1 | 5/2003 | Takagi et al. |
| 2003/0099464 A1 | 5/2003 | Oh et al. |
| 2003/0103604 A1* | 6/2003 | Kato et al. ................... 379/68 |
| 2003/0147629 A1 | 8/2003 | Kikuchi et al. |
| 2003/0188312 A1 | 10/2003 | Bae et al. |
| 2003/0189571 A1 | 10/2003 | MacInnis et al. |
| 2003/0189669 A1 | 10/2003 | Bowser |
| 2003/0190147 A1 | 10/2003 | Lee |
| 2003/0194211 A1 | 10/2003 | Abecassis |
| 2003/0202431 A1 | 10/2003 | Kim et al. |
| 2003/0206553 A1 | 11/2003 | Surcouf et al. |
| 2003/0216922 A1 | 11/2003 | Gonzales et al. |
| 2003/0235402 A1 | 12/2003 | Seo et al. |
| 2003/0235406 A1 | 12/2003 | Seo et al. |
| 2004/0001699 A1 | 1/2004 | Seo et al. |
| 2004/0003347 A1 | 1/2004 | Saidenberg et al. |
| 2004/0027369 A1 | 2/2004 | Kellock et al. |
| 2004/0047605 A1 | 3/2004 | Seo et al. |
| 2004/0054771 A1 | 3/2004 | Roe et al. |
| 2004/0081434 A1* | 4/2004 | Jung et al. ................... 386/95 |
| 2004/0151472 A1 | 8/2004 | Seo et al. |
| 2005/0013207 A1 | 1/2005 | Tsumagari et al. |
| 2005/0105888 A1 | 5/2005 | Hamada et al. |
| 2005/0147387 A1 | 7/2005 | Seo et al. |
| 2006/0013563 A1 | 1/2006 | Adolph et al. |
| 2006/0098936 A1 | 5/2006 | Ikeda et al. |
| 2006/0156358 A1 | 7/2006 | Adolph et al. |
| 2006/0259941 A1 | 11/2006 | Goldberg et al. |

FOREIGN PATENT DOCUMENTS

| | | |
|---|---|---|
| EP | 0737016 | 10/1996 |
| EP | 0863509 | 9/1998 |
| EP | 0 971 536 A1 | 2/2000 |
| EP | 0755161 | 10/2001 |
| EP | 1178691 | 2/2002 |
| EP | 1326451 | 7/2003 |
| GB | 1586431 | 3/1981 |
| JP | 09-102940 | 4/1997 |
| JP | 11-252518 | 9/1999 |
| JP | 2000-324395 | 11/2000 |
| JP | 2002-290895 | 10/2002 |
| JP | 2003-061098 | 2/2003 |
| JP | 2003-224826 | 8/2003 |
| JP | 2003-230136 | 8/2003 |
| KR | 10-2001-0001725 | 1/2001 |
| KR | 10-2002-0043812 | 6/2002 |
| KR | 10-2003-0030554 | 4/2003 |
| TW | 578068 | 3/2004 |
| WO | WO 03/105152 | 12/2003 |
| WO | WO 2005-034122 | 4/2005 |
| WO | WO 2005/045833 | 5/2005 |

OTHER PUBLICATIONS

Article from www.useit.com/alertbox: *Jakob Nielsen*'s Alertbox for Jul. 1, 1997: "Effective Use of Style Sheets".
English translation of Taiwanese Office Action dated Apr. 30, 2008 issued in corresponding Taiwanese Application No. 093133428.
Understanding SAMI 1.0, *Microsoft Corp*. XP007902747 (pub. Oct. 2001, updated Feb. 2003).

* cited by examiner

FIG. 7

| *.clpi{ |
|---|
| type_indicator |
| version_number |
| SequenceInfo_start_address |
| ProgramInfo_start_adress |
| CPI_start_address |
| ClipMark_start_adress |
| ClipInfo() |
| for(i=0; i<N1; I++){ |
| padding_word |
| } |
| SequenceInfo() |
| for(i=0; i<N2; I++){ |
| padding_word |
| ProgramInfo() |
| for(i=0; i<N3; I++){ |
| padding_word |
| } |
| CPI() |
| for(i=0; i<N4; I++){ |
| padding_word |
| } |
| ClipMark() |
| for(i=0; i<N5; I++){ |
| padding_word |
| } |
| } |

FIG. 8

| ClipInfo() { |
|---|
|     length |
|     Clip_stream_type |
|     application_type |
|     is_ATC_delta |
|     TS_recording_rate |
|     number_of_source_packets |
|     TS_type_info_block() |
|     if(is_ATC_delta==$1_b$) { |
|         number_of_ATC_delta_entries |
|         for (i=0; i<number_of_ATC_delta_entries; i++) { |
|             ATC_delta[i] |
|             following_Clip_Information_file_name[i] |
|             Clip_codec_identifier |
|         } |
|     } |
| } |

FIG. 9

| |
|---|
| SequenceInfo() { |
|    length |
|    number_of_ATC_sequences |
|    for(atc_id=0; atc_id<number_of_ATC_sequences; atc_id++){ |
|       SPN_ATC_start[atc_id] |
|       number_of_STC_sequences[atc_id] |
|       offset_STC_id[atc_id] |
|       for(stc_id=offset_STC_id[atc_id]<br>          stc_id<(number_of_STC_sequences[atc_id]<br>          +offset_STC_id[atc_id]);<br>          stc_id++){ |
|          PCR_PID [atc_id][stc_id] |
|          SPN_STC_start [atc_id][stc_id] |
|          presentation_start_time [atc_id][stc_id] |
|          presentation_end_time [atc_id][stc_id] |
|       } |
|    } |
| } |

FIG. 10

| |
|---|
| ProgramInfo() { |
|    length |
|    number_of_program_sequences |
|    for(i=0; i<number_of_program_sequences; atc_id++){ |
|       SPN_program_sequence_start[i] |
|       program_map_PID[i] |
|       number_of_streams_in_ps[i] |
|       For(stream_index=0;<br>          stream_index<number_of_streams_in_ps[i];<br>          stream_index++) { |
|          stream_PID[i][stream_index] |
|          StreamCodingInfo(i,stream_index) |
|       } |
|    } |
| } |
| |
| |

FIG. 11A

```
StreamCodingInfo(i,stream_index) {
    length
    stream_coding_type
    if(stream_coding_type==0x02) {
        video_format
        frame_rate
        aspect_ratio
        cc_flag
        ISRC()
    } else if (stream_coding_type==0x80 ||
              stream_coding_type==0x81 ||
              stream_coding_type==0x82 // dts) {
        audio_presentation_type
        sampling_frequency
        audio_language_code
        ISRC()
    } else if (stream_coding_type==0x90) {
                    // Presentation graphics stream
        PG_language_code
        ISRC()
    } else if (stream_coding_type==0x91) {
                    // Interactive graphics stream
        IG_language_code
        ISRC()
    }
    } else if (stream_coding_type==0x92) {
                    // Text subtitle stream
        TXTST_language_code
        character_code
        number_of_fonts
        for(i=0; i<number_of_fonts; i++) {
            font_file_name[i]
            font_id[i]
            font_name[i]
        }
        ISRC()
    }
}
```

FIG. 11B

| Character code | meaning |
|---|---|
| 0x00 | Unicode V1.1 (ISO 10646-1) |
| 0x01 | GBK18030-2000(Chinese) |
| 0x02 | GB2312(Chinese) |
| 0x03 | BIG5(Chinese) |
| 0x04 | Shift JIS (Japanese) |
| 0x05 | KSC 5601-1987 including KSC 5653 for Roman character (Korean) |
| Others | Reserved |

FIG. 12

| CPI() { |
|---|
| length |
| CPI_type |
| EP_map() |
| } |

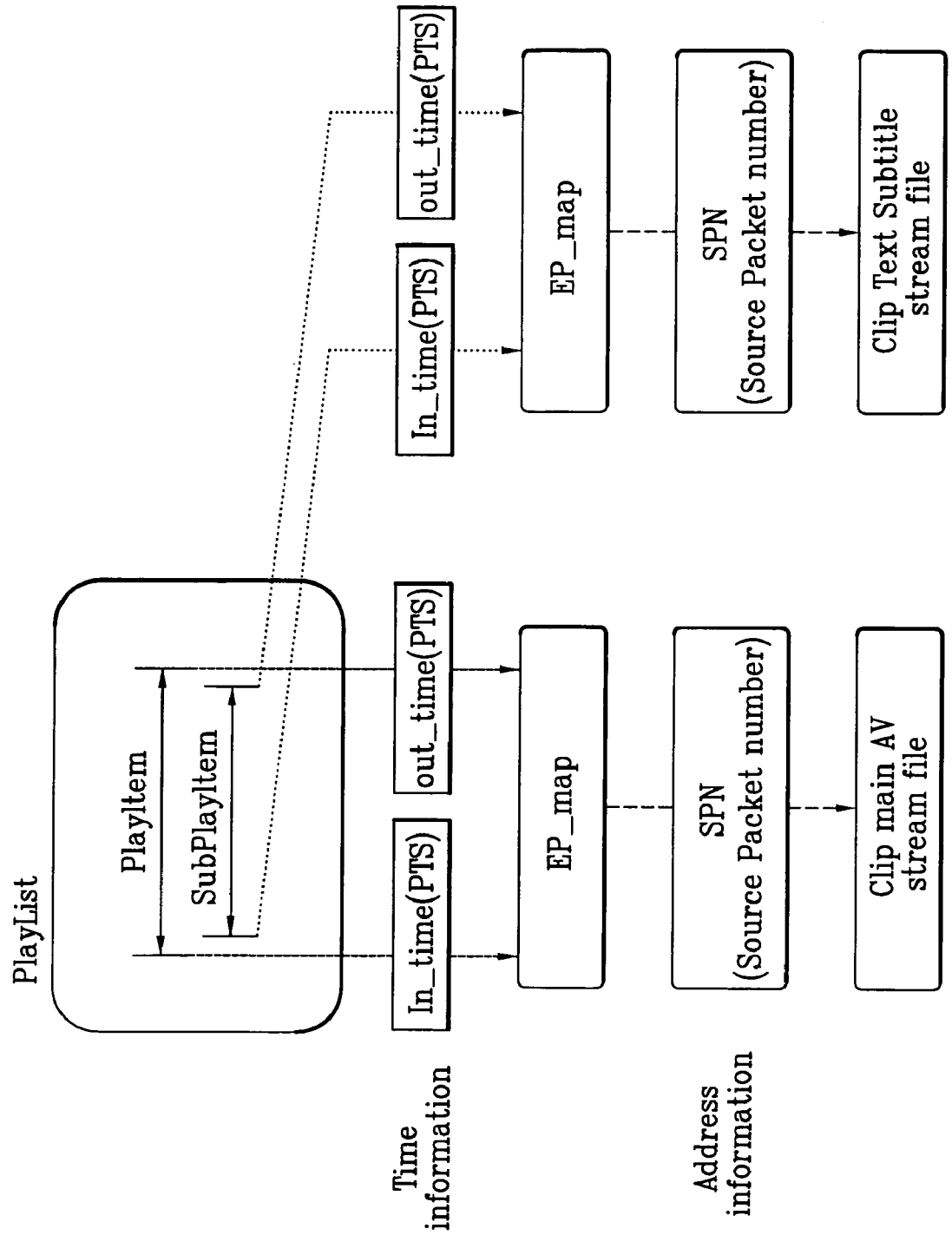

DSS: Dialog Style Segment
DPS: Dialog Presentation Segment

FIG. 13D

```
EP_map() {
    number_of_stream_PID_entries
    for(k=0; k<number_of_stream_PID_entries; k++) {
        stream_PID[k]
        EP_stream_type[k]
        num_EP_coarse_entries[k]
        num_EP_fine_entries[k]
        EP_map_for_one_stream_PID_start_address[k]
    }
    for(i=0; i<X; i++) {
        padding_word
    }
    for(k=0; k<number_of_stream_PID_entries; k++) {
        If(ES_stream_type[k]==1 || ES_stream_type[k]==3) {
            EP_map_for_one_stream_PID_AV(EP_stream_type[k],
                num_EP_coarse_entries[k];
                num_EP_fine_entries[k])
        }
        else if(ES_stream_type[k]==5) {
            EP_map_for_one_stream_PID_TXTST(EP_stream_type[k],
                num_EP_coarse_entries[k],
                0)
        }
        for (i=0; i<Y[k]; i++) {
            padding_word
        }
    }
}
```

FIG. 13E

| EP_map_for_one_stream_PID_TXTST(EP_stream_type,Nc,Nf) { |
|---|
| Reserved |
| for (i=0; i<Nc; i++) { |
|     PTS_EP_coarse[i] |
|     SPN_EP_coarse[i] |
| } |
| } |

RECORDING MEDIUM, REPRODUCING METHOD THEREOF AND REPRODUCING APPARATUS THEREOF

This application claims the benefit of the Korean Patent Application No. 10-2005-0032720, filed on Apr. 20, 2005, which is hereby incorporated by reference.

This application claims the benefit of the U.S. Provisional Application No. 60/564,960, filed on Apr. 26, 2004, in the name of inventors Kang Soo SEO, Jea Yong YOO, and Byung Jin KIM, entitled "CLIP INFORMATION FILE FOR THE TEXT SUBTITLE STREAM", which is hereby incorporated by reference as if fully set forth herein.

BACKGROUND OF THE INVENTION

1. Field of the Invention

The present invention relates to a recording medium, reproducing method thereof and reproducing apparatus thereof, and more particularly, to a method of recording auxiliary data such as a text subtitle stream and reproduction management information for reproducing the auxiliary data efficiently in a recording medium, a recording medium reproducing method using the same and a reproducing apparatus using the same.

2. Discussion of the Related Art

Generally, an optical disc on which a large volume of data is recordable is widely used as an optical record medium. Recently, many efforts are made to develop a new high density optical record medium (HD-DVD), on which video data of high definition and audio data of high quality can be recorded and stored, such as a Blu-ray disc (hereinafter abbreviated BD) and the like.

The Blu-ray disc (BD) that is a sort of a next generation HD-DVD technology is the next generation optical record solution enabling to be fully equipped with data to remarkably surpass the previous DVD, and the technology specifications of global standardizations for the BD are being established together with other digital equipments.

Moreover, although many efforts are made to develop optical record players adopting the BD specifications, there are many difficulties in developing a complete optical record player since the BD specifications fail in being fully established yet.

Specifically, in order to efficiently reproduce the data recorded in the BD, main AV data and various kinds of data such as text subtitle information as auxiliary data associated with the main AV data for user's convenience should be provided. Moreover, management information for reproducing the main and auxiliary data recorded in the optical disc should be systematized to provide.

However, the current BD specifications fail to be equipped with the unified specifications for the text subtitle stream file, whereby a great deal of limitation is put on full-scale development of the BD-based optical record players. Specifically, such limitation causes difficulty to recording and reproducing the text subtitle in the optical disc.

SUMMARY OF THE INVENTION

Accordingly, the present invention is directed to a recording medium, reproducing method thereof and reproducing apparatus thereof that substantially obviate one or more problems due to limitations and disadvantages of the related art.

An object of the present invention is to provide a recording medium in which auxiliary data and reproduction management information for reproducing the auxiliary data efficiently are recorded, a reproducing method thereof and a reproducing apparatus thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium according to the present invention includes a text subtitle stream including at least one dialog presentation segment (DPS) and one dialog style segment (DSS) and a clipinfo file (*.clpi) as reproduction management information to reproduce the text subtitle stream, wherein map information mapped to a dialog presentation segment (DPS) within the text subtitle stream is recorded in the clipinfo file.

In another aspect of the present invention, a recording medium includes a main stat stream, an auxiliary data stream utilized in reproducing the main data stream, and a clipinfo file (*.clpi) as reproduction management information for reproducing the main and auxiliary data streams, respectively, wherein at least two map informations are recorded in the clipinfo file for the main data stream and wherein one map information is recorded in the clipinfo file for the auxiliary data stream.

In another aspect of the present invention, a recording medium includes an auxiliary data stream utilized in reproducing a main data stream and a reproduction management file as reproduction management information for reproducing the auxiliary data stream, wherein the reproduction management file includes map information having a plurality of entries mapped to the auxiliary data stream and wherein each of the entries includes time information and address information.

In another aspect of the present invention, a recording medium includes a main AV stream, a text subtitle stream reproduced by being synchronized with the main AV stream, and clipinfo files (*.clpi) as reproduction management information for reproducing the main AV stream and the text subtitle stream, respectively, wherein the main AV stream includes at least one 'STC_sequence', wherein the text subtitle stream includes one 'STC_sequence' and wherein each of the clipinfo files includes a number of the 'STC_sequence'.

In another aspect of the present invention, in reproducing a main AV stream and a text subtitle stream associated with the main AV stream, a text subtitle stream reproducing method of a recording medium includes the steps of storing the text subtitle stream by preloading, decoding the text subtitle stream using mapping information provided from a reproduction management file for reproducing/managing the text subtitle stream, and displaying the decoded text subtitle stream.

In another aspect of the present invention, in reproducing a recording medium in which a main data stream and an auxiliary data stream utilized in reproducing the main data stream, a recording medium reproducing method includes the steps of reading reproduction management information from reproduction management files for reproducing the main and auxiliary data streams, respectively and reproducing the main and auxiliary data streams utilizing the read reproduction management information, wherein at least two map informations are read from the reproduction management file for the main data stream and wherein one map information is read from the reproduction management file for the auxiliary data stream.

In another aspect of the present invention, in reproducing a recording medium in which an auxiliary data stream utilized in reproducing a main data stream, a recording medium reproducing method includes the steps of reading reproduction management information from a reproduction management file for reproducing the auxiliary data streams and reproducing the auxiliary data stream utilizing the read reproduction management information, wherein the reproduction management file includes map information having a plurality of entries mapped to the auxiliary data stream and wherein each of the entries includes time information and address information.

In a further aspect of the present invention, in reproducing a main AV stream and a text subtitle stream associated with the main AV stream, a text subtitle reproducing apparatus for a recording medium includes a buffer storing the text subtitle stream by preloading, a decoder decoding the text subtitle stream using mapping information provided from a reproduction management file for reproducing/managing the text subtitle stream, and a graphic plan displaying the decoded text subtitle stream.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 7 to 12 are diagrams of syntaxes of a reproduction management file according to the present invention;

FIGS. 13A to 13E are diagrams of mapping information structures and syntaxes within a reproduction management file according to the present invention.

DETAILED DESCRIPTION OF THE INVENTION

Figure 1:
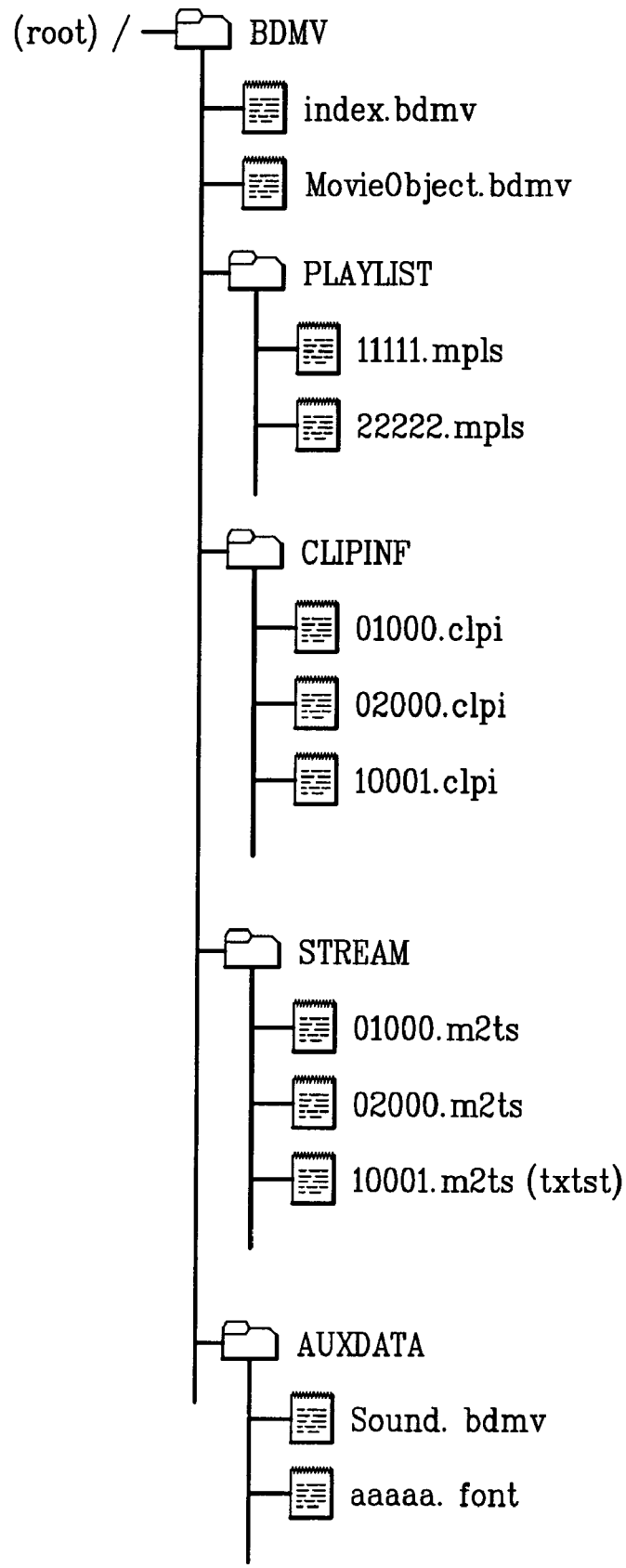
FIG. 1 is a diagram of a file structure of a high density optical disc according to the present invention.

Reference will now be made in detail to the preferred embodiments of the present invention, examples of which are illustrated in the accompanying drawings. Wherever possible, the same reference numbers will be used throughout the drawings to refer to the same or like parts. Besides, although terms used in the present invention are possibly selected from the currently well-known ones, some terms are arbitrarily chosen by the applicant in some cases so that their meanings are explained in detail in the following description. Hence, the present invention should be understood with the intended meanings of the corresponding terms chosen by the applicant instead of the simple names or meanings of the terms themselves.

'Recording medium' in the present invention means all kinds of data recordable media and includes all media such as an optical disc, magnetic tape and the like regardless of their recording methods. In the following description of the present invention, an optical disc, and more particularly, a 'Blu-ray disc (BD)' will be taken as an example will be used as the recording medium for convenience of explanation. Yet, it will be apparent to those skilled in the art that the technical features of the present invention are applicable to other recording media in the same manner.

Relating to terms associated with the present invention, 'main data' is title information recorded in an optical disc to mean video and voice data provided to a user by a disc author. 'Main data' is recorded by MPEG2 format, which may be called 'main AV stream'.

'Auxiliary data' is the entire data associated with 'main data' provided to a user for convenience of reproducing 'main data', and includes subtitle information, interactive graphic stream, presentation graphic stream, sound information, auxiliary audio data including a browsable slide show, etc. In accordance with the features of the respective auxiliary data, 'auxiliary data' may be recorded by multiplexing with AV stream by MPEG2 format or can be recorded in a stream file independent from the main AV stream by MPEG2 format or other format.

'Subtitle' as the auxiliary data is a kind of caption information. 'Subtitle' means information displayed on one side of a screen if a user, who intends to view a currently played video (main AV data) with a captioned specific language, selects one of subtitles supported by an optical disc for the specific language. Hence, 'subtitle' can be provided in various ways. Specifically, 'subtitle' recorded by text data is called 'text subtitle'.

In case of formatting 'text subtitle' by MPEG2 and recording 'text subtitle' into a stream file independent from 'main data', the present invention intends to provide a method of configuring 'text subtitle stream file' to record in an optical disc, a method of reproducing the recorded 'text subtitle stream file', and an apparatus thereof.

First of all, the record format of recording main data and auxiliary data including text subtitle data in a disc and the file structure of managing them are explained in detail with reference to FIG. 1 and FIG. 2 as follows.

FIG. 1 is a diagram of a file structure that manages data recorded in a disc.

Referring to FIG. 1, at least one BD directory BDMV exists beneath one root directory. In the BD directory BDMV, index file index.bdmv and object file MovieObject.bdmv are included as general file (upper file) information to secure interactivity with a user. Moreover, four kinds of directories, which have reproduction information for the data substantially recorded in a disc and information for a method of reproducing the reproduction information, such as playlist directory PLAYLIST, clipinfo directory CLIPINF, stream directory STREAM, and auxiliary data directory AUXDATA are included in the BD directory BMDV as well. The four kinds of directories and the files included therein will be explained as follows prior to the detailed description of the relations between text subtitle information associated with the present invention and files.

First of all, files for video and audio streams, which are called 'main AV stream', recorded in a disc according to specific formats and auxiliary stream such as text subtitle (hereinafter called text subtitle stream) independently exist in the stream directory STREAM. For instance, '*.m2ts' is used as each extension name of AV stream files 01000.m2ts, 02000.m2ts, and 10001.m2ts since the AV stream files are generally recorded by MPEG2 transport packets. Yet, in case of the text subtitle stream 10001.m2ts, '*.txtst' can be used as the file extension name since the text subtitle stream 10001.m2ts has auxiliary data feature different from that of the main AV stream, for example.

In the BD specifications, the AV stream may be named a clip stream file. Relating to the present invention, the text subtitle data will exist in the form of a separate file from the AV stream file. Namely, the text subtitle data exist as the text subtitle stream file 10001.m2ts or 10001.txtst.

The clipinfo directory CLIPINF consists of clipinfo files (*.clpi) in one-to-one correspondence to the stream files (*.m2ts), respectively. Specifically, attribute information and timing information of the AV stream are recorded in the clipinfo files (*.clpi). And, in such information, mapping information, which can search a specific location of the corresponding stream file (*.m2ts) from time information (in-time, out-time) provided by PlayItem or SubPlayItem after a presentation time stamp (PTS) and a source packet number (SPN) correspond to each other in table form by entry point mapping, may be included according to a kind of the clip. Besides, the information included in the Clip info file (*.clpi) associated with the text subtitle stream of the present invention will be explained in detail with reference to FIGS. 7 to 13E. Namely, the present invention relates to the configuration of the Clip info file (*.clpi) for reproducing the text subtitle stream.

In the BD specifications, the one-to-one correspondent stream file (*.m2ts) and clipinfo file (*.clpi) are combined to be named 'clip'. Hence, the file 10001.clpi within the clipinfo directory CLIPINF includes the attribute information and the like for the file within the stream directory STREAM such as a text subtitle stream file 10001.m2ts, whereby the files 10001.clpi and 10001.m2ts configure one clip.

The playlist directory PLAYLIST consists of playlist files (*.mpls), and each of the playlist files (*.mpls) includes at least one PlayItem designating a playing interval of reproducing a specific clip.

Hence, PlayItem has time information for play-start time (in-time) and play-end time (out-time) of a specific reproduction-requested clip, i.e., a clip designated as a clip name (Clip_Information_File_name) within PlayItem, which is utilized in the mapping information of the clipinfo files (*.clpi) as mentioned in the foregoing description. Consequently, the playlist file (*.mpls) becomes basic reproduction file information for performing the reproduction of the requested clip by the combination of at least one or more PlayItems.

Moreover, SubPlayItem for reproduction management of auxiliary data is occasionally included in the playlist file (*.mpls). For instance, in case that SubPlayItem for reproducing text subtitle is provided, the corresponding SubPlayItem is synchronized with PlayIetm to reproduce the data. Yet, in case that SubPlayItem for reproducing browsable slide show is provided, the corresponding SubPlayItem is non-synchronized with PlayIetm to reproduce the data.

A path for reproducing main data by at least one PlayItem within the playlist file is called a main path. And, a path for reproducing a text subtitle stream as auxiliary data is called a subpath. Namely, one main path should be provided within the playlist file and at least one subpath is provided per auxiliary data attribute if associated auxiliary data exists.

In the present invention, auxiliary data including text subtitle is managed by SubPlayItem, which will be explained in detail later.

The auxiliary data directory AUXDATA is an area for recording auxiliary data files for disc reproduction separately therein. For instance, in order to support more user-friendly disc reproduction, 'sound file (Sound.bmdv)' for providing click sound, 'font file *.font or *.otf' applied to text subtitle reproduction, and the like are recorded therein.

Hence, it may be able to record the text subtitle stream 10001.m2ts that is a kind of auxiliary data in the auxiliary data directory AUXDATA in case of specific use.

Moreover, in the above-explained BD directory BDMV, the index file index.bdmv and object file MovieObject.bdmv exist as general files to secure the interactivity with user. Specifically, the index file index.bdmv is mainly configured with index Table in which user-selectable menu information and title information are included.

Figure 2:
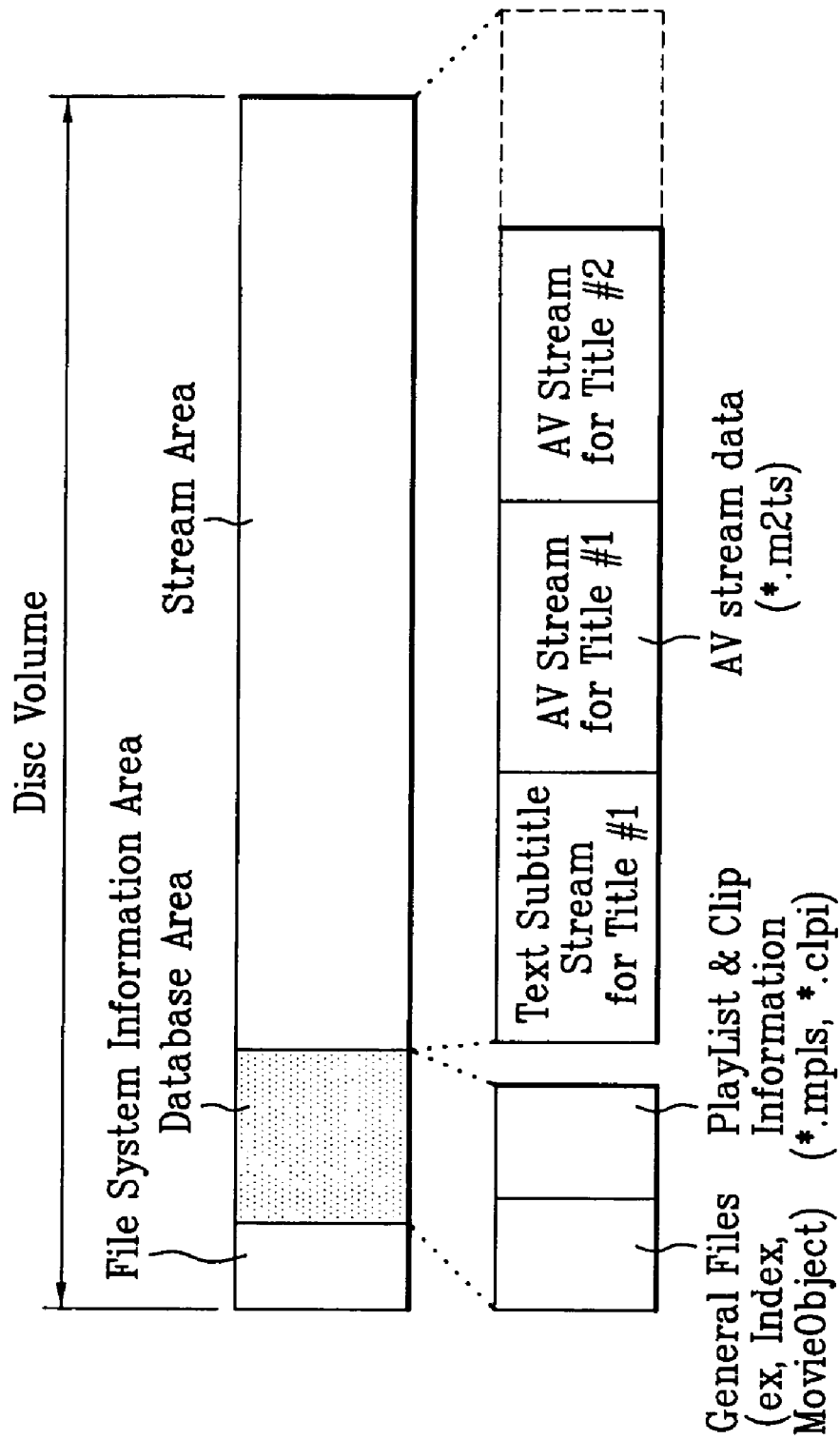
FIG. 2 is a diagram of a data record format of a high density optical disc according to the present invention.

FIG. 2 is a schematic diagram of showing how various kinds of information associated with the file structure are recorded in a disc according to the present invention.

Referring to FIG. 2, in viewpoint of an inner circumference of a disc, there exist a file system information area as system information for managing entire files, a database area where playlist and clipinfo files for reproducing the recorded stream file (*.m2ts) and index file index.bdmv and object file MovieObject.bdmv as higher files (general files) are recorded and a stream file area where main data such as audio, video, graphic and the like and auxiliary data existing independently without being multiplexed with the main data is recorded.

Hence, via the file information within the database area and/or the stream management information within the stream file area (Stream Area, a user decides the main and auxiliary data to be reproduced and their reproduction method.

The substantial configuration of the text subtitle stream file according to the present invention is explained in detail as follows. First of all, management information for reproducing text subtitle is newly defined. And, a method of configuring a text subtitle stream file including the defined management information, a text subtitle reproduction method of reproducing a recorded stream file and a reproduction apparatus thereof are explained in detail.

Figure 3:
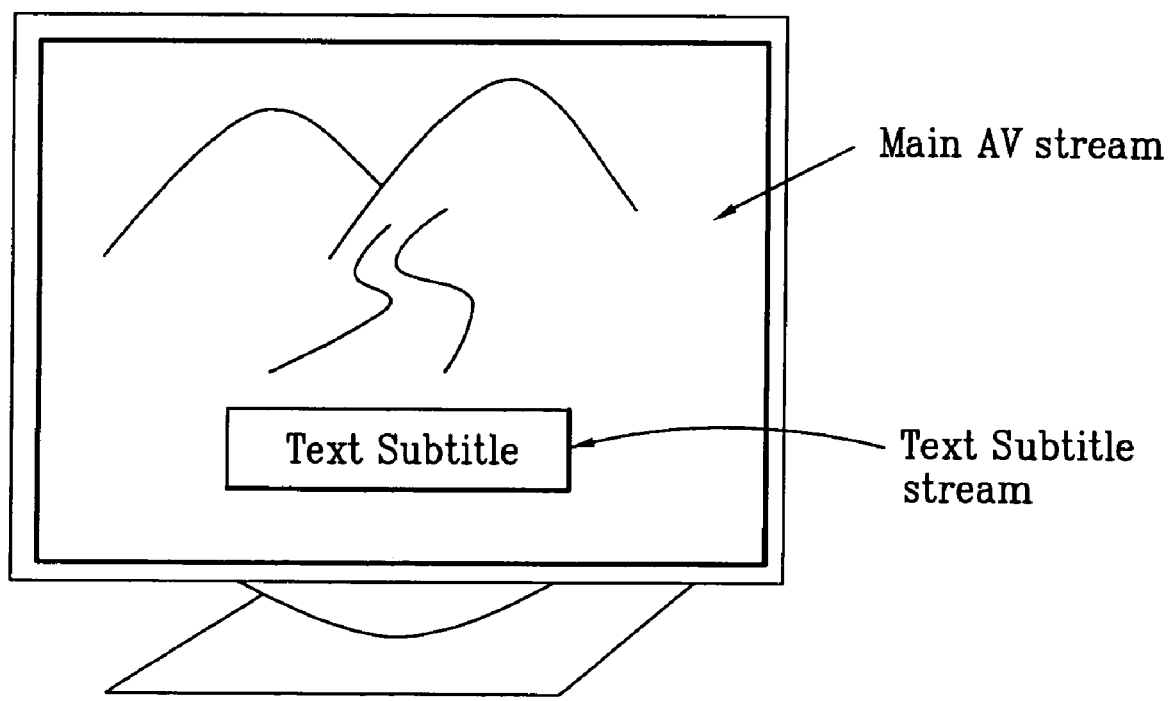
FIG. 3 is a diagram of a displayed image of a text subtitle stream on a screen according to the present invention.

FIG. 3 shows that text subtitle data and main data are simultaneously displayed on one picture according to the present invention, in which the text subtitle is synchronized by time with the main data to be provided. Namely, the text subtitle data should be synchronized with the main data to be provided.

Figure 4:
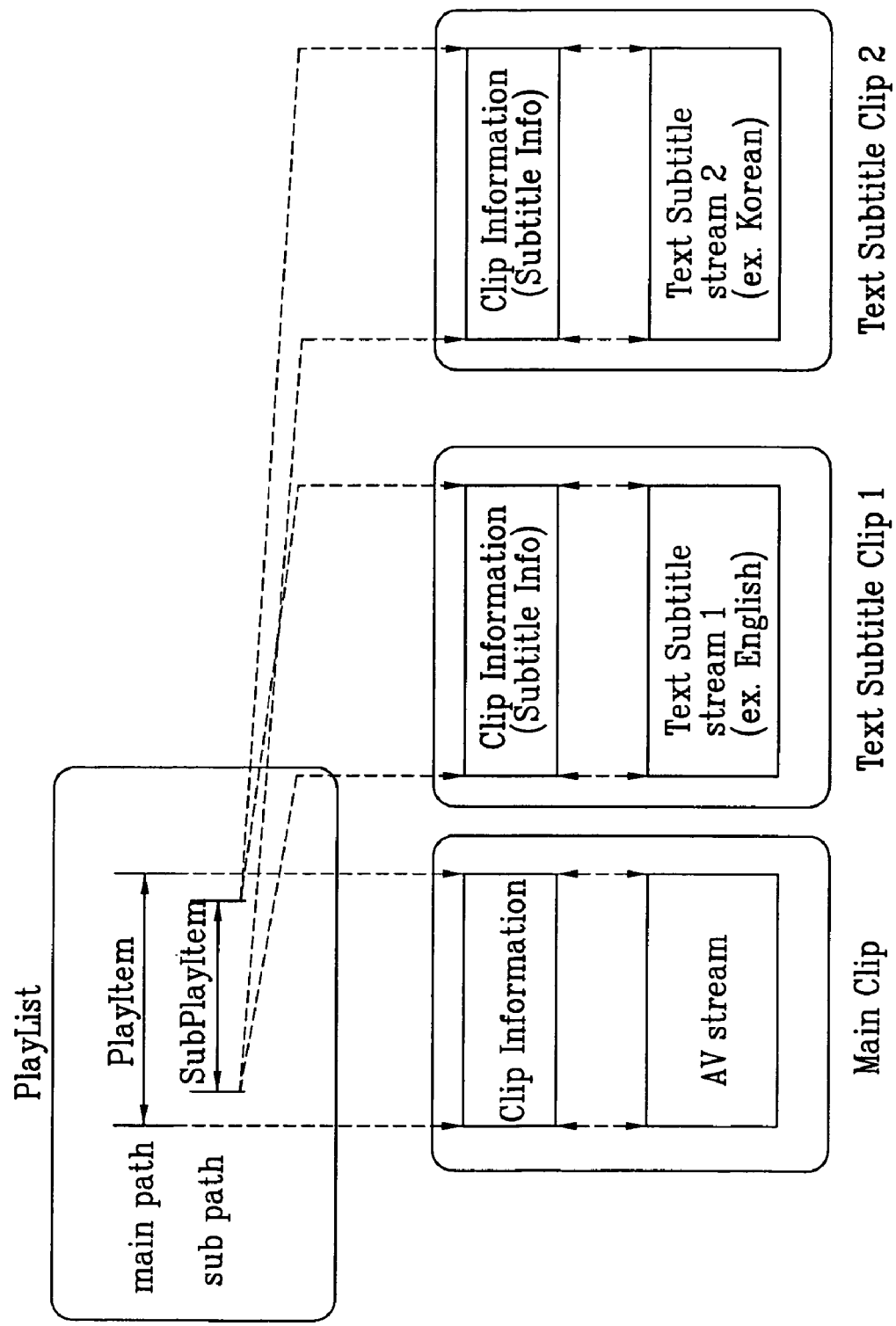
FIG. 4 is a diagram of a file structure for reproduction management of a text subtitle stream according to the present invention.

FIG. 4 graphically shows a method of reproducing a text subtitle according to the present invention in association with file information on a file structure, in which the text subtitle of the present invention is managed by SubPlayItem within PlayList and is reproduced and managed together with a plurality of text subtitle clips within one SubPlayItem.

Specifically, at least one PlayItem for reproduction management of main data (i.e., main clip) exists within a PlayList file. In case that a text subtitle associated with main AV data exists, it is managed by SubPlayItem as a subpath. For instance, in FIG. 4, a text subtitle clip 1 in English and a text subtitle clip 2 in Korean separately exist. The respective text subtitle clip 1 and clip 2 are synchronized with the main data by time, and will be displayed on a screen together with the main data on a specific presentation time.

Hence, in order to reproduce the text subtitle, the minimal information including reproduction presentation time, position and size on the screen is needed. And, various kinds of management information configuring the text subtitle are explained in detail with reference to FIGS. 5 to 5 as follows.

Figure 5A:
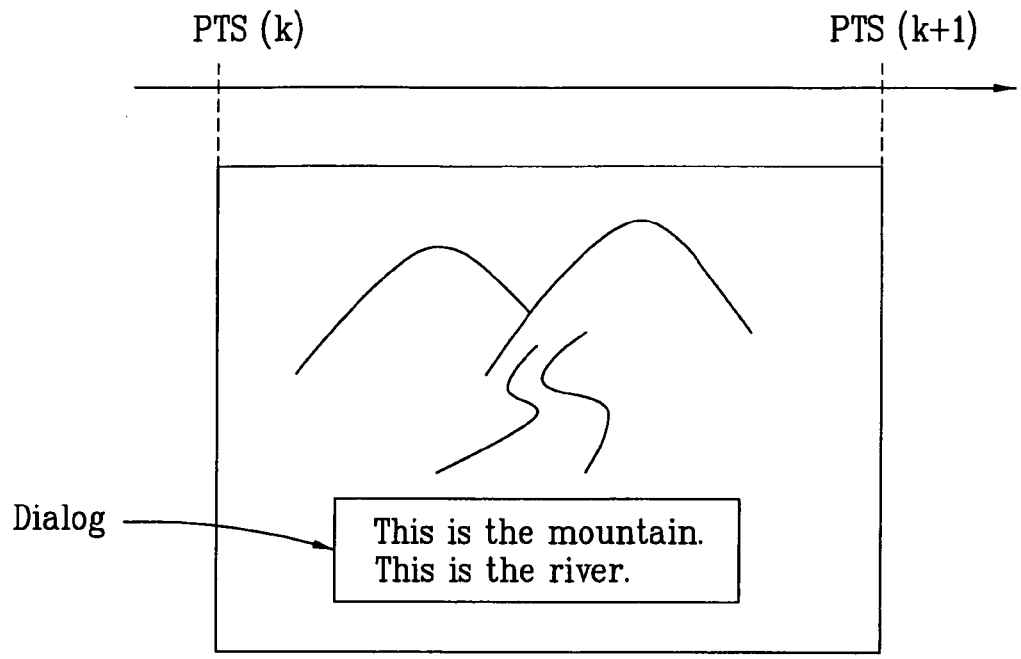
FIGS. 5A to 5C are diagrams of utilizing reproduction management information for reproducing a text subtitle according to the present invention.
Figure 5B:
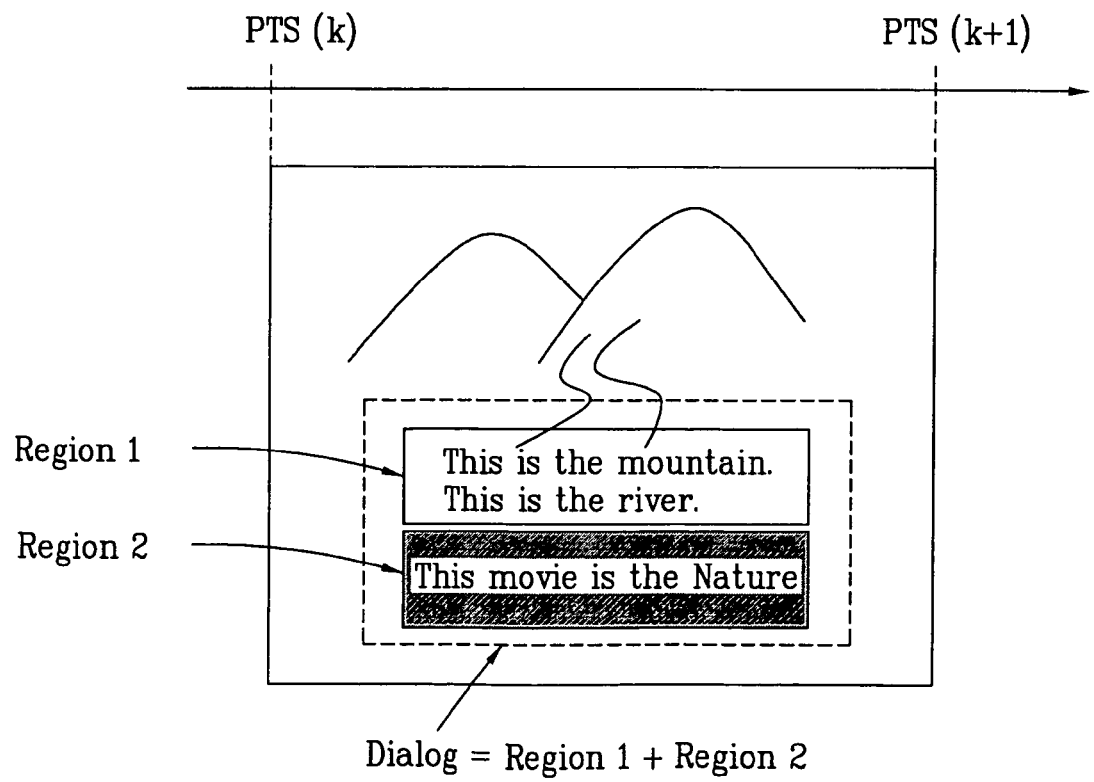
Figure 5C:
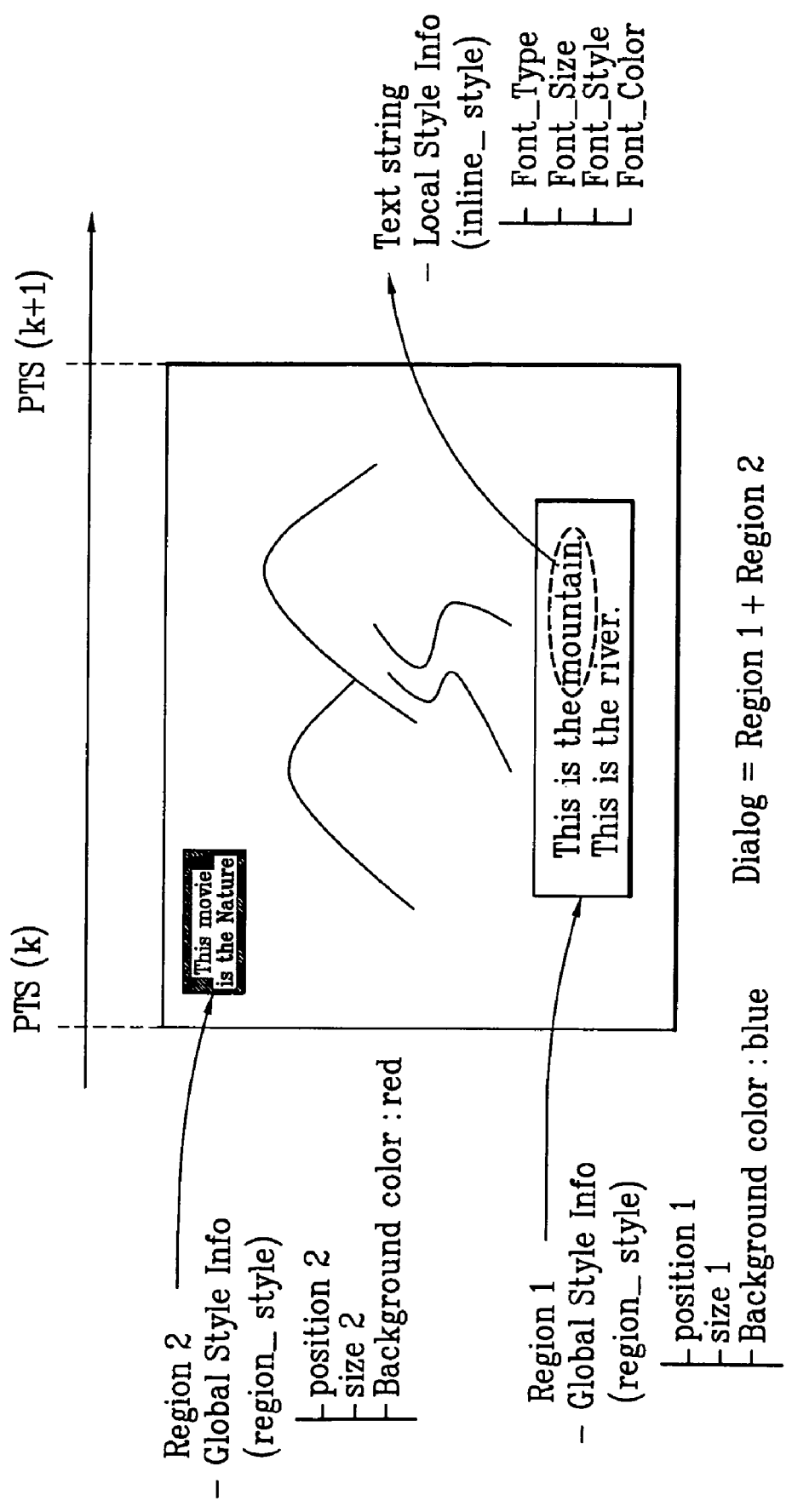

FIGS. 5A to 5C show text subtitle reproduction management information recorded within a text subtitle stream according to the present invention, in which dialog information, region information and style information are explained, respectively.

FIG. 5A shows dialog information (Dialog) as information for reproduction management of a text subtitle of the present invention, in which 'Dialog' means the management information of unifying to manage at least one text data existing within a specific presentation time.

Namely, a presentation time for informing a reproduction time on a screen is generally displayed by 'PTS (presentation time stamp)' and the entire text subtitle displayed during a specific PTS section is defined as 'Dialog', thereby enhancing the convenience for reproduction management. Specifically, a PTS section for reproducing one Dialog is defined by 'dialog_start_PTS' and 'dialog_end_PTS'.

For instance, in case that text subtitle data displayed during a time between PTS(k) and PTS(k+1) is constructed with two lines, the entire text subtitle data is defined by the same Dialog. Preferably, the character code number of the text subtitle data included in Dialog is about maximum one hundred.

FIG. 5B shows region information as information for reproduction management of a text subtitle of the present invention, in which 'region' means a region to which style information (Style Info, specifically, 'global style information') that will be explained later is identically applied as information configuring Dialog existing within a specific presentation time. And, maximum two regions enable to exist within one Dialog. Namely, Dialog may consist of one region or two regions to exist.

In the present invention, maximum two regions enabling to exist within one Dialog only are defined, which takes the decoding load on reproducing text subtitle into consideration. It is apparent that maximum n regions (n≧2) can be defined to exist within one Dialog in another embodiment.

FIG. 5C shows style information (Style Info) as information for reproduction management of a text subtitle of the present invention, in which 'style information (Style Info)' is information for designating a method of displaying text subtitle data on a screen. Position on the screen, size, background color, and the like correspond to essential style information (Style Info). Besides, various kinds of information such as text alignment, text flow, and the like are defined to utilize as the style information (Style Info) if necessary.

In the present invention, it is intended to divide the style information (Style Info) into 'global style information (Global Style Info)' and 'local style information (Local Style Info)' to utilize. This is to display text subtitle data more variously.

Namely, 'global style information (Global Style Info)' as style information (Style Info) identically applied per region is the information for designating position, size, and the like of each region of text subtitle within a screen, and may be called 'region style information (region_styles)' as well. FIG. 5C shows an example that two regions (region #1 and region #2) have different 'region style information (region_styles)', respectively. Region 1 (region #1) is the region style information region_styles to have 'position1, size1, color=blue', whereas region 2 (region #2) is the region style information region_styles to have 'position2, size2, color=red Moreover, 'local style information (Local Style Info)' as style information (Style Info) applied per data line or text data character within a region may be called 'inline style information (inline_styles)'. For instance, FIG. 5C shows an example that 'inline style information (inline_styles)' is applied within region #1, in which inline style information (inline_styles) different from other ext is applied to a 'mountain' portion of text data.

Figure 6:
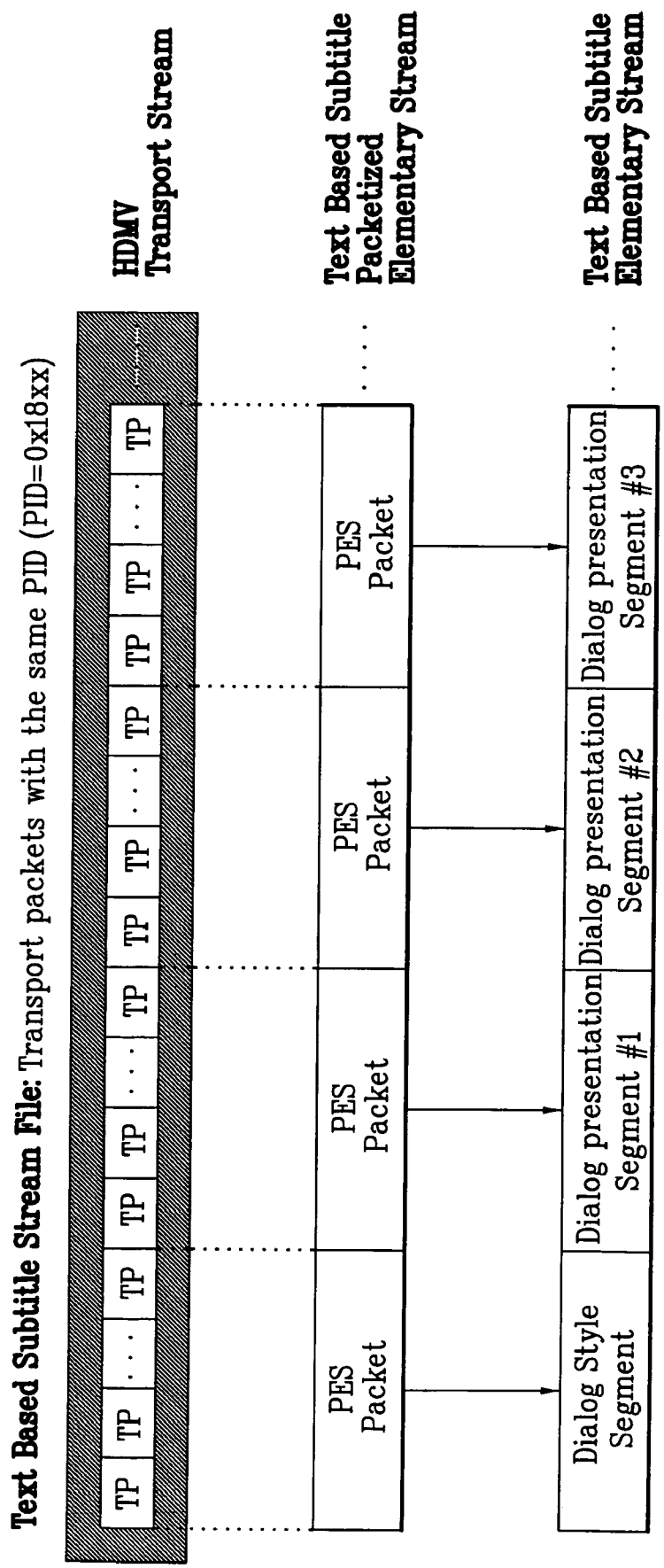
FIG. 6 is a diagram of a text subtitle stream file structure according to the present invention.

FIG. 6 shows a structure of a text subtitle stream file according to the present invention, in which a structure of the text subtitle stream file 10001.m2ts is illustrated for example.

Namely, the text subtitle stream of the present invention is configured with transport stream of MPEG2 transport streams. The same packet identifier (PID), e.g., 'PID=0x18xx', is given to each transport packet TP configuring the stream. Hence, an optical record reproduction apparatus reads out the transport packet having 'PID=0x18xx' given thereto from input stream, thereby facilitating to read out the text subtitle stream only.

Moreover, a plurality of transport packets TPs construct one packet stream (PES, packet elementary stream). The present invention forms one packet stream PES in each dialog, thereby facilitating dialog reproduction.

Besides, in the first packet stream PES within the text subtitle stream, 'dialog style unit (DSU)' is recorded as a set unit of region style information (region styles) among the style information (Style Info). In the rest packet stream PES after the second, 'dialog presentation unit (PDU)' is recorded as a unit of recording real dialog information therein.

Hence, in case of adopting the text subtitle stream structure in FIG. 6, each dialog information defined in FIGS. 5A to 5C means dialog present segment (DPS) and the style information within the dialog information means the information (region_style_id) that links one among a various region style information (region styles) set defined in the dialog style segment (DSS) and the inline style information (inline styles).

In the present invention, the region style information (region styles) set, which is decided to have the maximum number by specifications, is recorded in the dialog style segment (DSS). For instance, maximum sixty unique style informations are recorded and they are identified by region style IDs (region_style_id), respectively.

FIG. 7 shows a syntax of a clipinfo file (*.clpi) according to the present invention.

Referring to FIG. 7, a syntax of a clipinfo file (*.clpi) according to the present invention is provided not only for reproduction management of a text subtitle stream but also for reproducing various data including 'main AV clip', 'text subtitle clip' and the like according to a clip type. Hence, a specific field of the syntax structure of the clipinfo file (*.clpi) has no relation to the text subtitle stream of the present invention or is defined as specific fixed value in case of using the text subtitle stream.

In FIG. 7, the clipinfo file (e.g., 10001.clpi) includes five information groups 'ClipInfo( )', 'SequenceInfo( )', 'ProgramInfo( )', 'CPI( )' and 'ClipMark( )'. The 'ClipMark( )' includes information for indexing a specific position within a clip but has not relation to the text subtitle of the present invention. So, its detailed explanation will be skipped in the following. 'ClipInfo( )', 'SequenceInfo( )', 'ProgramInfo( )' and 'CPI( )' are sequentially explained with reference to FIGS. 8 to 13E as follows.

FIG. 8 shows a 'ClipInfo( )' syntax within a clipinfo file (*.clpi) of the present invention, in which 'ClipInfo( )' includes general management informations of the clipinfo file.

Referring to FIG. 8, information indicating an overall length of 'ClipInfo( )' is written in a 'length' field.

And, information indicating a stream type of a corresponding clip is written in a 'Clip_stream_type' field. In the BD specifications, its value is generally set to '1' to indicate 'MPEG2 transport stream'.

Moreover, information indicating an application_type reproduced/managed by a corresponding clipinfo is written in an 'application_type' field. For instance, it can be defined as follows. First of all, '1' means an AV stream movie managed by a main path. '2' means a time based slide show managed by a main path. '3' means a browsable slide show managed by a main path. '4' means a browsable slide show managed by a main path. '5' means an interactive graphic stream manage managed by a subpath. And, '6' means a text subtitle stream managed by a subpath. Hence, if a clipinfo file (*.clpi) is the clipinfo file (e.g., 10001.clpi) for reproducing/managing the text subtitle stream by the present invention, it will be 'application_type=6'.

In case of reproducing/managing the text subtitle stream by 'application_type=6', the rest fields (e.g., Is_ATC_delta, TS_recording_rate, number_of_source_packets and TS_type_info_block( )) within 'ClipInfo( )' become insignificant information to be ignored by an optical record/reproducing apparatus.

FIG. 9 shows a 'SequenceInfo( )' syntax within a clipinfo file (*.clpi) of the present invention.

Referring to FIG. 9, 'SequenceInfo( )' includes informations indicating a presence or non-presence of sequence of a specific stream managed by a clipinfo file.

First of all, information indicating an overall length of 'SequenceInfo( )' is written in a 'length' field'.

And, information indicating the number of units identified by a continuous ATC (arrival time clock) of a corresponding clip is written in 'number_of_ATC_sequence' field. In the BD specifications, its value is generally set to '1' so that one ATC (arrival time clock) exists in a specific clip.

Moreover, information indicating the number of units identified by STC (system time clock) existing within 'ATC-sequence' of a corresponding clip is written in 'number_of_STC_sequence' field. In case of an AV stream, a plurality of values can be provided to the field in general. Yet, in case of a text subtitle, its value is set to '1' to define that there exists one 'STC_sequence' only.

Namely, the text subtitle stream of the present invention, as shown in FIG. 6, includes one stream separated from a main AV stream, Hence, each of the 'ATC_sequence' and 'STC_sequence' should be set to '1'.

In 'SPN_ATC_start' field, information indicating a start SPN (number) of 'ATC_sequence' within a specific clip is written. Generally, 'SPN_ATC_start=0' is set.

In 'PCR_PID' field, a PID (packet identification) value within a transport packet including PCR (program reference clock) is written. Since the text subtitle stream of the present invention does not include PCR in 'STC_sequence', the field is set to '0x1FFF'.

In 'SPN_STC_start' field, information indicating a start SPN (source packet number) of 'STC_sequence' within 'ATC_sequence' is written. In case of the text subtitle stream of the present invention, it is set to 'SPN_STC_start=0'.

In 'presentation_start_time' field, time information indicating a reproduction start time within a corresponding 'STC_sequence' is written. Since the text subtitle stream includes one 'STC_sequence', the 'Dialog_start_PTS' value, as shown in FIG. 6, within a first DPS (dialog presentation segment) is correspondent.

Finally, in 'presentation_end_time' field, time information indicating a reproduction end time within the corresponding 'STC_sequence' is written. Since the text subtitle stream includes one 'STC_sequence', the 'Dialog_end_PTS' value, as shown in FIG. 6, within a last DPS (dialog presentation segment) is correspondent.

FIG. 10 shows a 'ProgramInfo( )' syntax within a clipinfo file (*.clpi) of the present invention.

Referring to FIG. 10, 'ProgramInfo( )' includes informations indicating program attributes of a specific stream managed by a clipinfo file.

First of all, information indicating an overall length of 'ProgramInfo( )' is written in a 'length' field.

In 'number_of_program_sequence' field, information indicating the number of programs within a corresponding clip is written. In the BD specifications, a corresponding value is set to '1' so that one program is managed by a specific clipinfo file only.

In 'SPN_program_sequence_start' field, information indicating a start SPN (source packet number) within the program is written. Generally, it is set to 'SPN_program_sequence_start=0'.

In 'number_of_stream_in_ps' field, information of the number of elementary streams existing within a corresponding program is written. Each of the elementary streams is provided with a 'stream_PID' field and 'StreamCoding Info( )' to record a PID value and coding information of a corresponding elementary stream. The 'StreamCoding Info( )' is explained in detail with reference to FIG. 11A and FIG. 11B as follows.

FIG. 11A shows a per elementary stream 'StreamCoding-Info( )' syntax within 'ProgramInfo( )' of the present invention.

Referring to FIG. 11A, 'StreamCodingInfo( )' includes coding informations of a corresponding elementary stream.

First of all, information indicating an overall length of 'StreamCodingInfo( )' is written in a 'length' field.

In 'stream_coding_type' field, a coding type of a corresponding elementary stream is written. For instance, it is defined in a following manner. First of all, 'stream_coding_type=0x02' means an MPEG2 video stream. 'stream_coding_type=0x80, 0x81 or 0x82' means a 'LPCM', 'AC-3' or 'DTS' type audio stream. 'stream_coding_type=0x90' means a presentation graphic stream. 'stream_coding_type=0x91' means an interactive graphic stream. And, 'stream_coding_type=0x92' means a text subtitle stream.

In 'StreamCodingInfo( )', detailed attribute information is written according to the 'stream_coding_type'. For instance, if a corresponding elementary stream means a text subtitle stream by 'stream_coding_type=0x92', the following attribute information is included.

First of all, in 'TXTST_language_code' field, language information of a corresponding text subtitle is written. The corresponding language information follows the International Standard (e.g., ISO646).

In 'character_code' field, character code information used in the text subtitle stream is written. A text within the text subtitle stream of the present invention is written by Big Endian format. And, FIG. 11B is a table of the character code information written in the 'character_code' field.

In 'number_of_fonts' field, the number of font files used for a corresponding text subtitle stream is written. Each of the font files is provided with 'font_file_name', 'font_id' and 'font_name' fields to designate a font file utilized for the corresponding text subtitle stream among the font files (*font) existing in the auxiliary directory AUXDATA of FIG.

1. Specifically, the designated font file is utilized for a text subtitle decoding apparatus that will be described in FIG. 14.

Figure 12:
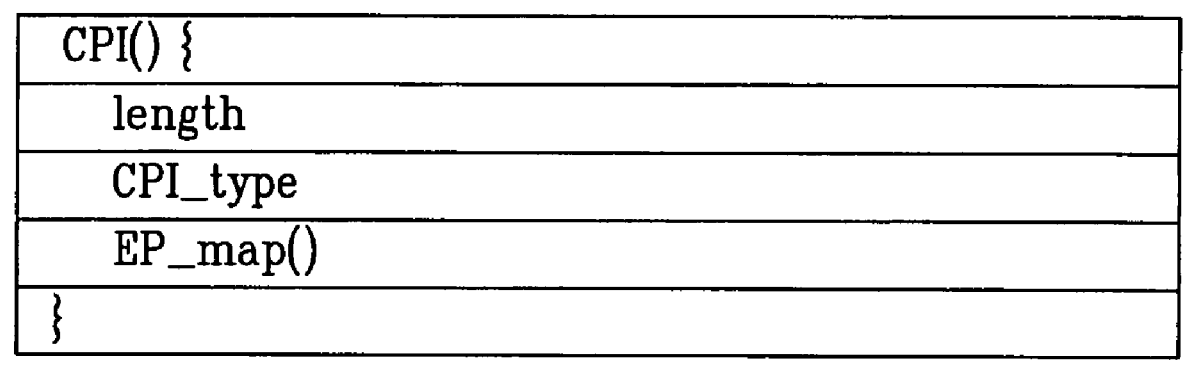

FIG. 12 shows a 'CPI( )' syntax within a clipinfo file (*.clpi) of the present invention.

Referring to FIG. 12, 'CPI( )' (characteristic point information) includes informations transforming time information managed by a clipinfo file into an address of a corresponding stream.

First of all, information indicating an overall length of 'CPI( )' is written in a 'length' field.

And, 'CPI_type' is the information designating a CPI type applied to a corresponding clipinfo file. For instance, in the CPI types, there are 'EP_map (entry point map)' and 'TMAP (time map)' to configure the CPI with a different type. Yet, in the BD specifications, the 'EP_map (entry point map)' type is generally utilized. Alternatively, in another specifications, 'TMAP' is also applicable instead of 'EP_map'. Hence, the technical principle of the present invention is applicable in the same manner in case of 'TMAP'.

FIGS. 13A to 13E show a detailed structure and syntax of 'EP_map (entry point map)' applicable to the present invention.

FIG. 13A is a conceptional diagram of a structure of 'EP_map' used in the present invention.

Referring to FIG. 13A, a main AV stream within one PlayList is managed by PlayItem within the PlayList. Specifically, PlayItem includes a clipinfo file name (Clip_Information_file_name) for reproduction management and time information indicating reproduction start time (IN-Time) and reproduction end time (OUT-Time) of a designated clip. Hence, by recording EP-map type mapping information in a clipinfo file reproduced/managed by PlayItem, it is able to transform the PTS information into SPN (source packet number) within the main AV stream.

By the same method, management for a text subtitle stream is conducted by SubPlayItem within PlayList. Specifically, a clipinfo file name (Clip_Information_file_name) for reproduction management and time information indicating reproduction start time (IN-Time) and reproduction end time (OUT-Time) of a designated clip are includes in a SubPlayItem syntax. Hence, by recording Ep_map type map information having the same concept of the main AV stream in the clipinfo file reproduced/managed by SubPlayItem, it is able to transform the PTS information into SPN (source packet number) within the text subtitle stream. Therefore, an optical record/reproducing apparatus can read 'EP_map' provided within the clipinfo file of a disc to utilize. The optical record/reproducing apparatus of the present invention needs not to generate separate 'EP_map' for the text subtitle stream. In another implementation, instead of recording 'EP_map' in a clipinfo file within an optical disc, the optical record/reproducing apparatus can generate 'EP_map' separately. Since 'EP_map' for the text subtitle stream can be simply configured, a load is barely put on the optical record/reproducing apparatus.

In the present invention, 'EP_map' for main AV stream and 'EP_map' for text subtitle stream differ from each other in implementation. For instance, 'EP_map' for main AV stream provided with both 'EP_coarse_entris' and 'EP_fine_entris' has a very precise 'EP_map'. Yet, 'EP_map' for text subtitle stream provided with one 'EP_coarse_entris' only has a simple 'EP_map'. Namely, since a text subtitle stream generally includes data of which volume is smaller than that of a main AV stream, one 'EP_coarse_entris' is enough.

In a stream associated with auxiliary data, the present invention enables efficient reproduction of auxiliary data by map information such as 'EP_map' and 'TMAP'.

Figure 13B:
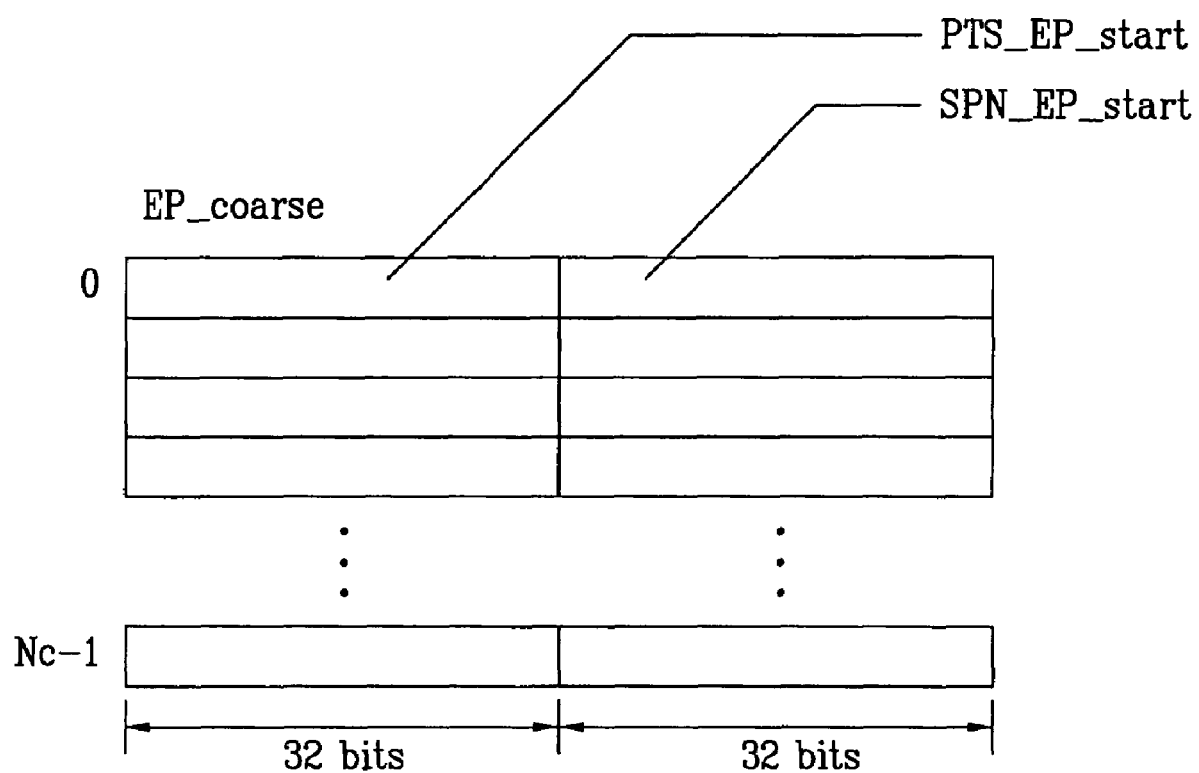

FIG. 13B shows 'EP_coarse_entris' as 'EP_map' applied to the text subtitle stream.

Referring to FIG. 13B, 'EP_map' includes total Nc entries. Each of the entries has eight bytes including 32-bit 'PTS_EP_start' and 32-bit 'SPN_EP_start'.

Figure 13C:
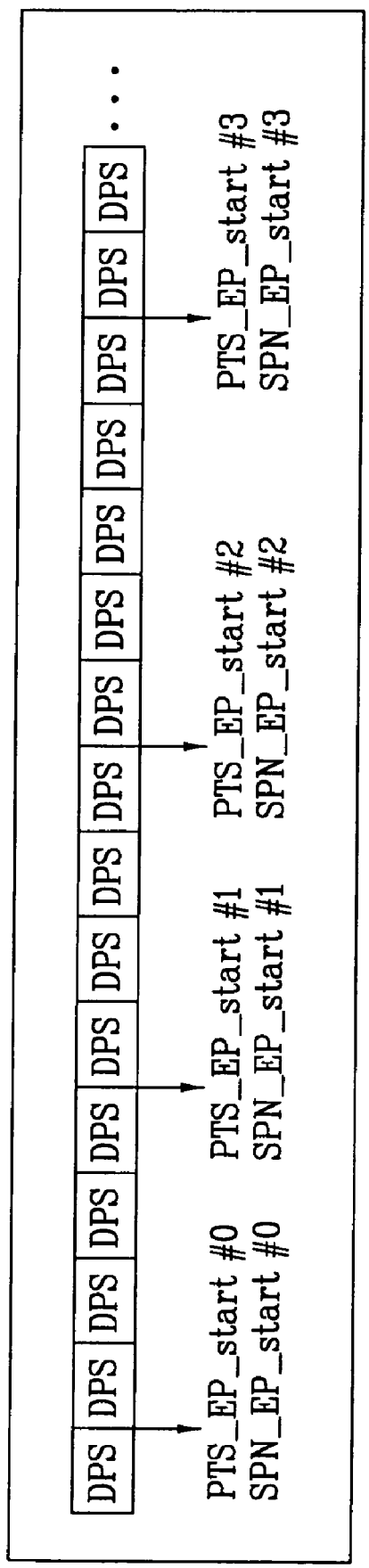

FIG. 13C shows the 'EP_map' applied to the text subtitle stream of the present invention.

Referring to FIG. 13C, a first entry of 'EP_map' is made to coincide with a first DPS within a text subtitle stream. Sequentially, 'EP_map' entries are generated to leave a predetermined interval from each other by taking the first DPS as a reference. Hence, a search operation is enabled via the 'EP_map' in reproducing the text subtitle stream.

FIG. 13D shows an 'EP_map( )' syntax included in 'CPI( )' of the present invention. 'EP_map' of the present invention, as mentioned in FIGS. 13A to 13C, is differently configured according to a stream type. For instance, in case of 'EP_stream_type=1' or 'EP_stream_type=3', both 'EP_coarse_entris' and 'EP_fine_entris' are provided. In case of 'EP_stream_type=5 (text subtitle)', 'EP_coarse_entris' is provided only.

FIG. 13E shows an 'EP_map_for_one_stream_PID_TXTST( )' syntax corresponding to a case of 'EP_stream_type=5 (Text subtitle). Within the corresponding syntax, 'PTS_EP_coarse[i]' and 'SPN_EP_coarse[i]' fields to configure 'EP_coarse_entris' are provided within the corresponding syntax.

Figure 14:
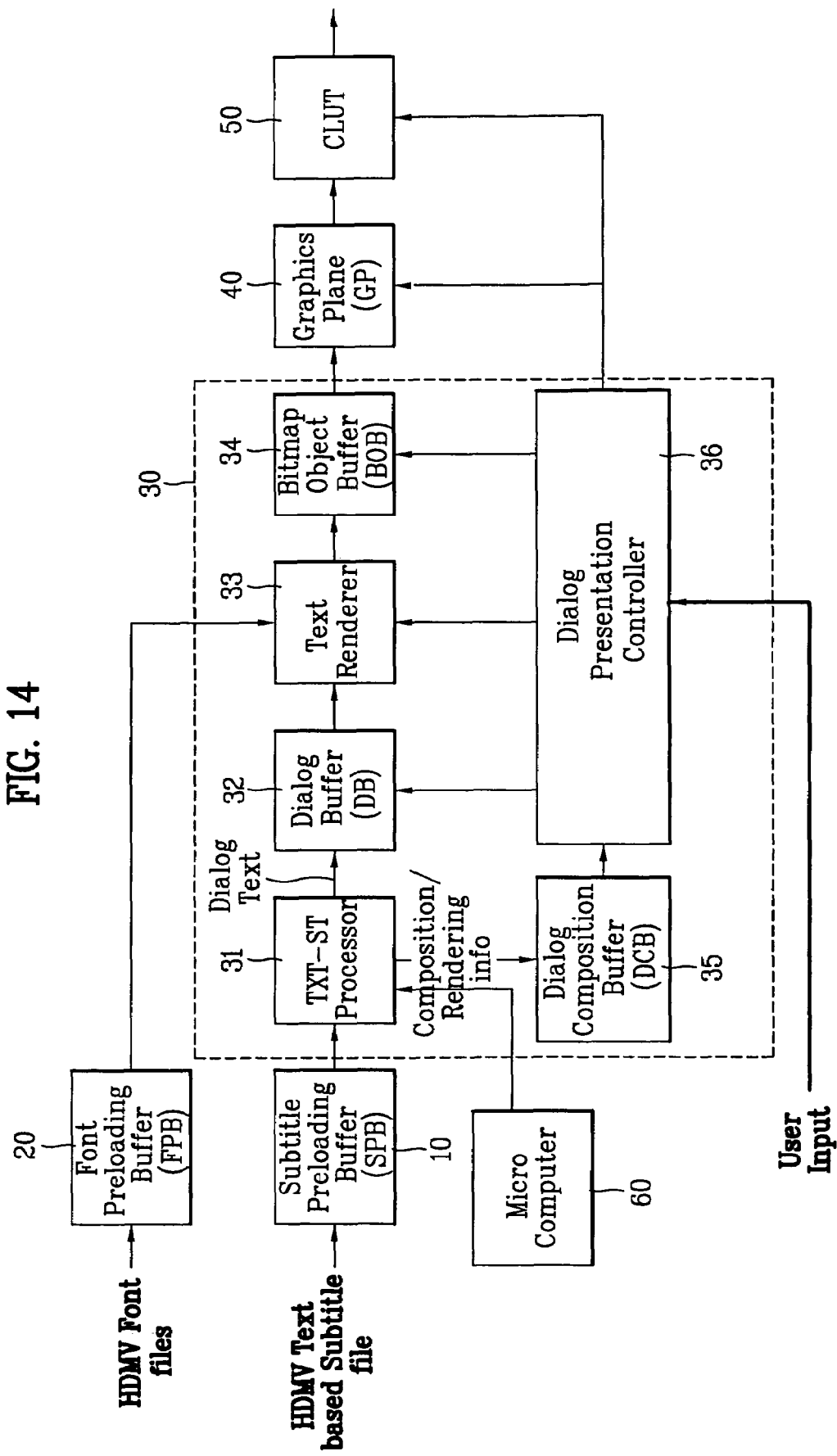
FIG. 14 is a block diagram of a text subtitle decoding device within an optical record/reproduction apparatus according to the present invention.

FIG. 14 is a block diagram of a text subtitle decoding device within an optical record/reproduction apparatus according to the present invention.

Referring to FIG. 14, a text subtitle decoding device includes a subtitle preloading buffer (SPB) 10 having a text subtitle stream preloaded therein, a font preloading buffer (FPB) 20 in which font information associated with the text subtitle stream is preloaded, a text subtitle decoder 30, a graphic plane 40 for displayed screen adjustment, a CLUT (color lookup table) 50 providing a table-formatted control value for adjusting color, transparency and the like of a screen, and a microcomputer controlling operations between elements including the text subtitle decoder 30.

A decoding method using the above-configured text subtitle decoding device according to the present invention is explained as follows.

First of all, once an optical disc is loaded, the optical record/reproducing apparatus including the text subtitle decoding device reads file information for optical disc reproduction. Once a specific user's title reproduction command is received, the apparatus reproduces PlayList associated with a specific title to be reproduced.

Namely, to reproduce PlayList, the apparatus reproduces main AV stream managed by PlayItem via a video/audio decoding means (not shown in the drawing). The apparatus stores a stream of a specific language selected by a user from text subtitle streams managed by SubPlayItem, e.g., Korean 'Text Subtitle Clip 1' in the preloading buffer 10 as soon as stores a specific font file (e.g., aaaaa.font or aaaaa.otf in FIG. 1) read from the optical disc according to font information designated within a clipinfo file (*,clpi) within the 'Text Subtitle Clip 1' in the font preloading buffer 20.

Thus, after all actions are completed, decoding of the text subtitle is initiated to provide the associated text subtitle together when the main stream managed by PlayItem is displayed on a screen. The text subtitle stream is reproduced with reference to the reproduction management information within the clipinfo file (*,clpi) in FIGS. 7 to 13E. And, the reproduced text subtitle stream data is synchronized with the main data to be reproduced.

The decoding process of the text subtitle can be divided into the following three steps.

First of all, a first step is a process of parsing the text subtitle stream information according to a purpose into composition information, rendering information and dialog text information. This is called a parsing step. To carry out the parsing step, a text subtitle (TXT-ST) processor 31 is provided within the text subtitle decoder 30, the composition information and the rendering information are stored in a dialog composition buffer (DCB) 35, and the dialog text information is stored in a dialog buffer (DB) 32.

A second step is a process of rendering text data within the dialog text information into bitmap data using the rendering information. The rendering information means style information that is applied in transforming the text subtitle into the bitmap data. To carry out the rendering step, a text renderer 33 and a dialog presentation controller 36 are provided within the text subtitle decoder 30 and the text data among the dialog text information parsed in the parsing step into the bitmap data.

For the rendering step, the text renderer 33 receives the font information applied to the corresponding text data and the rendering information applied to the corresponding data from the font preload buffer 20 and the DP controller 36, respectively, renders the text data into the bitmap data using the inline style information applied per text string of the corresponding text data within the dialog text, and then stores a corresponding result in a bitmap object buffer (BOB) 34.

A third step is a process of completing the reproduction of the text subtitle by adding the finally rendered text data, i.e., the bitmap data to the graphic plane GP by the composition information. The composition information means the information designating a displayed time of the text subtitle on the screen. To carry out the composition step, the DP controller 36 is provided within the text subtitle decoder 30 and the bitmap object stored in the BOB buffer 34 in the rendering step is configured within the graphic plane (GP) 40 according to the composition information. Specifically, palette information of the composition information is inputted to the CLUT 50 to be utilized as information for color variation.

Thus, it may happen that the text subtitle preloaded in the subtitle preloading buffer (SPB) 10 needs to be searched or randomly accessed according to user's selection or necessity while being reproduced using the text subtitle decoding device. For this, needed is mapping information connecting PTS (presentation time stamp) information of the preloaded text subtitle to substantial address within the preloaded buffer.

As the mapping information, 'EP_map' within the clipinfo file (*.clpi) in FIGS. 13A to 13E is utilized. Yet, according to examples, 'EP_map' can be directly generated from the text subtitle decoding device of the optical record/reproducing apparatus to be utilized.

Accordingly, the text subtitle can be efficiently reproduced through the text subtitle stream file in the recording medium the reproduction management configuring method, the reproducing method and the reproducing apparatus.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A recording medium, comprising:
   a main data stream;
   a text subtitle stream including at least one dialog presentation segment (DPS) and one dialog style segment (DSS) for use with the main data stream, each of the dialog presentation segments (DPSs) defining at least one region; and
   information files including management information for managing reproduction of the main data stream and the text subtitle stream, respectively,
   wherein the management information includes map information mapping time information to address information for the main data stream, and the dialog presentation segment (DPS) includes text strings and inline style information for a portion of the region, and the dialog style segment (DSS) includes region style information for all of the region defined in the dialog presentation segment (DPS), the dialog presentation segment (DPS) referencing the region style information defined in the dialog style segment (DSS) using an identifier.

2. The recording medium of claim 1, wherein the management information includes language information for the text subtitle stream.

3. The recording medium of claim 1, wherein the management information includes font information for the text subtitle stream.

4. The recording medium of claim 1, wherein the map information includes coarse map information and fine map information.

5. The recording medium of claim 1, wherein the information files include an information file for each text subtitle stream.

6. A method of reproducing a main data stream and a text subtitle stream recorded on a recording medium, the reproducing method comprising:
   reading management information from management files for reproducing the main data stream and the text subtitle stream, the text subtitle stream including at least one dialog presentation segment (DPS) and one dialog style segment (DSS), respectively, each of the dialog presentation segments (DPSs) defining at least one region; and
   reproducing the main data stream and the text subtitle stream using the management information,
   wherein the management information includes map information mapping time information to address information for the main data stream, and the dialog presentation segment (DPS) includes text strings and inline style information for a portion of the region, and the dialog style segment (DSS) includes region style information for all of the region defined in the dialog presentation segment (DPS), the dialog presentation segment (DPS) referencing the region style information defined in the dialog style segment (DSS) using an identifier.

7. The method of claim 6, wherein the management information includes language information for the text subtitle stream.

8. The method of claim 6, wherein the management information includes font information for the text subtitle stream.

9. The method of claim 6, wherein the map information includes coarse map information and fine map information.

10. The method of claim 6, wherein the management files include an information file for each text subtitle stream.

11. A method of recording data streams, comprising:
   operating a recording apparatus to record a main data stream and a text subtitle stream, the text subtitle stream including at least one dialog presentation segment (DPS) and one dialog style segment (DSS) for use with the main data stream, each of the dialog presentation segments (DPS)s defining at least one region; and recording information files including management information for reproducing the main data stream and the text subtitle stream, respectively, wherein the management information includes map information mapping time information to address information for the main data stream, and the dialog presentation segment (DPS) includes text strings and inline style information for a portion of the region, and the dialog style segment (DSS) includes region style information for all of the region defined in the dialog presentation segment (DPS), the dialog presentation segment (DPS) referencing the region style information defined in the dialog style segment (DSS) using an identifier.

12. The method of claim 11, wherein the management information includes language information for the text subtitle stream.

13. The method of claim 11, wherein the management information includes font information for the text subtitle stream.

14. The method of claim 11, wherein the map information includes coarse map information and fine map information.

15. The method of claim 11, wherein the information files include an information file for each text subtitle stream.

16. An apparatus for reproducing data streams, comprising:

a pickup configured to read data streams recorded on a recording medium;

a controller configured to control the pickup to read a main data stream and a text subtitle stream, the text subtitle stream including at least one dialog presentation segment (DPS) and one dialog style segment (DSS) utilized with the main data stream, and an information file including management information for reproducing the main data stream and the text subtitle stream, respectively, each of the dialog presentation segments (DPSs) defining at least one region, wherein the management information includes map information mapping time information to address information for the main data stream, and the dialog presentation segment (DPS) includes text strings and inline style information for a portion of the region, and the dialog style segment (DSS) includes region style information for all of the region defined in the dialog presentation segment (DPS), the dialog presentation segment (DPS) referencing the region style information defined in the dialog style segment (DSS) using an identifier.

17. The apparatus of claim 16, wherein the controller is configured to control the pickup to read the management information which includes language information for the text subtitle stream.

18. The apparatus of claim 16, wherein the controller is configured to control the pickup to read the management information which includes font information for the text subtitle stream.

19. The apparatus of claim 16, wherein the controller is configured to control the pickup to read the map information which includes coarse map information and fine map information.

20. The apparatus of claim 16, wherein the controller is configured to control the pickup to read the information files which include an information file for each text subtitle stream.

21. An apparatus for recording data streams on a recording medium, comprising:

a pickup configured to record data streams on a recording medium;

a controller configured to control the pickup to record a main data stream and a text subtitle stream, the text subtitle stream including at least one dialog presentation segment (DPS) and one dialog style segment (DSS) utilized with the main data stream, and an information file including management information for reproducing the main data stream and the text subtitle stream, respectively, each of the dialog presentation segments (DPSs) defining at least one region, wherein the management information includes map information mapping time information to address information for the main data stream, and the dialog presentation segment (DPS) includes text strings and inline style information for a portion of the region, and the dialog style segment (DSS) includes region style information for all of the region defined in the dialog presentation segment (DPS), the dialog presentation segment (DPS) referencing the region style information defined in the dialog style segment (DSS) using an identifier.

22. The apparatus of claim 21, wherein the controller is configured to control the pickup to record the management information which includes language information for the text subtitle stream.

23. The apparatus of claim 21, wherein the controller is configured to control the pickup to record the information file which includes font information utilized for each text subtitle stream.

24. The apparatus of claim 21, wherein the controller is configured to control the pickup to record the map information which includes coarse map information and fine map information.

25. The apparatus of claim 21, wherein the controller is configured to control the pickup to record the information files which includes an information file for each text subtitle stream.

* * * * *